Patented July 17, 1934

1,966,852

UNITED STATES PATENT OFFICE 1,966,852

REFINING MALEIC ACID

Michael N. Dvornikoff, St. Louis, Mo., assignor, by mesne assignments, to Monsanto Chemical Company, a corporation of Delaware No Drawing. Application February 9, 1931, Serial No. 514,711

2 Claims. (Cl. 202—52)

This invention relates to the treatment of maleic acid whereby a crude product may be purified economically and without excessive by-product formation.

This application is a continuation in part of my co-pending application, S. N. #439,263, filed March 26, 1930.

Maleic acid undergoes intermolecular rearrangement, forming fumaric acid, when it is exposed to an elevated temperature. The rate of this rearrangement increases as the temperature is increased.

A further obstacle to the successful distillation of maleic acid is introduced by reason of the fact that when maleic acid is maintained at temperatures even as low as 75° C., it decomposes into maleic anhydride and water. At this temperature, the vapor pressures of both the water and anhydride are very appreciable. In an effort to remove the maleic acid rapidly from the zone of heating and thereby reduce fumaric acid formation, it has been proposed heretofore to distill maleic acid under reduced pressure with the result that the maleic acid, largely in the form of maleic anhydride and water, passes directly from solid to vapor phase. The fact that the remaining material is in a dry condition impairs the heat transfer, exposes the acid to prolonged high temperature, promotes local overheating and renders the process of no practical value.

To overcome these disadvantages, it has been proposed that maleic acid be distilled in the presence of an inert nonaqueous liquid medium whereby the water distills off as formed with the inert liquid, leaving the anhydride dissolved or suspended, after which it is separated therefrom by fractionation or distillation. This process suffers the inconveniences of relatively large quantities of a foreign constituent as well as the need of extensive equipment for the refining of a comparatively small output of product.

In my copending application, I have disclosed a method of treating crude maleic acid whereby substantial yields of maleic anhydride may be obtained. Briefly stated, the process consists in distilling maleic acid under prescribed conditions and fractionally condensing the vapors. The less volatile maleic anhydride condenses whereas the water vapor and remaining maleic anhydride are conducted to a separate condensing system in which complete condensation of the remaining vapors is effected. When maleic acid is desired in lieu of maleic anhydride, fractional condensation is not practiced and the entire charge is condensed in a single receptacle resulting in the formation of the acid directly.

I have found that by controlling the conditions of distillation whereby a liquid phase is maintained in the still preferably by adding the crude acid progressively to the charge and by limiting the quantity of acid undergoing treatment at any time as well as restricting as much as possible the time of exposure of the acid to elevated temperature conditions, one is enabled to refine maleic acid effectively and obtain a pure product which is substantially free from the usual impurities, while at the same time avoiding to a very large extent, if not entirely, fumaric acid formation.

The process may be operated either as a continuous, semi-continuous, or strictly batch process, one characteristic feature of all being the presence of a liquid phase in the still during the distillation.

Since under the conditions of the distillation, the temperature is sufficiently high to promote fumaric acid formation, the quantity of maleic acid undergoing distillation at any time is restricted. Nevertheless, fumaric acid may be formed and is disposed of by draining the still periodically or removing such residue in any other manner. A stirring mechanism should be employed for the purpose of preventing local overheating and otherwise facilitating the heat transfer from the vessel to the liquid; also to promote dissolving or melting of the solid in the liquid.

The maintenance of the liquid phase is dependent upon a number of factors, notably the temperature of the vessel, the capacity of the equipment to transfer heat from the source thereof into the charge, the pressure within the vessel, the quantity and nature of the impurities in the crude maleic acid and other factors.

With practice, the liquid phase can be maintained without difficulty. In general, other conditions being favorable, the temperature should be maintained as low as possible while maintaining the presence of a liquid phase in an amount sufficient to gain the advantages of a heat transfer from the wall of the vessel to the solid maleic acid through a liquid phase rather than directly from the vessel to the solid acid.

With most types of crude acid, both extremes in temperature as well as pressures are to be avoided. Thus even when heating the vessel vigorously, it is possible to reduce the pressure sufficiently to effect total disappearance of the liquid phase, notwithstanding the fact that there is at all times an excess of solid phase. After the molten phase has once disappeared, the heat transfer to the solid material is reduced to such an extent that local overheating and the formation of fumaric acid exceeds the bounds of commercial practicability. Facilities and conditions for improving the rate of heat transfer from the vessel to the charge including adequate agitating means, large exposed heating surface as well as others well known to those skilled in the art, are to be favored. Various pressure and temperature conditions will be found operative, depending in each instance to some extent upon the purity of the product being treated, the nature of the equipment, etc.

Examples of the application of the principles of my invention are hereinafter set forth. Maleic acid is heated to about 110° C. in a receptacle provided with an agitating mechanism adapted to be operated under reduced pressure conditions. As this temperature is attained, at least a portion of the acid will liquefy and the charge as a whole attains a mush consistency. The product is distilled under reduced pressure conditions, 50–60 mm. having been found suited to this particular temperature. Crude acid is added progressively during the distillation to replenish that which is distilled. If maleic anhydride is desired as one of the products, a fractional condensation may be undertaken. If, on the other hand, the acid alone is required, a single complete condensation will be found satisfactory.

Another procedure which exemplifies the principles of the invention consists in charging an enamel steam jacketed kettle, which is provided with an agitator, with a small amount of the crude material containing 85–95 per cent acid product. The charge is heated by means of steam or other heating medium within the jacket and at the same time it is slowly agitated. After a liquid phase appears, the temperature in the jacket is adjusted to correspond to that of steam at 25–30 pounds pressure (130°–135° C.) and the pressure within the kettle is reduced to 30–50 mm. Crude maleic acid is added continuously or periodically to the still at such a rate as to replenish the acid that is distilled. The evolved acid vapors probably consisting mainly of maleic anhydride and water are condensed in any desired manner. One convenient method consists in bringing the vapors in contact with a saturated aqueous solution of maleic acid from which the refined acid is precipitated in crystalline form and is separated and dried by the ordinary methods.

What I claim is:

1. The method of refining crude maleic acid that comprises distilling the same in the absence of an organic solvent at a temperature not substantially in excess of 135° C. and under subatmospheric pressure conditions while maintaining a liquid phase of the acid in the still by subatmospheric pressure and temperature control.

2. The method as defined in claim 1 and further characterized in that the temperature of distillation is greater than 100° C. but not substantially above 135° C. and the pressure not substantially more than 60 mm.

MICHAEL N. DVORNIKOFF.